US011043899B2

(12) United States Patent
Webb et al.

(10) Patent No.: US 11,043,899 B2
(45) Date of Patent: Jun. 22, 2021

(54) ZERO INDUCTOR VOLTAGE CONVERTER TOPOLOGY WITH IMPROVED SWITCH UTILIZATION

(71) Applicants: Samuel Dylan Webb, Kingston (CA); Yan-Fei Liu, Kingston (CA)

(72) Inventors: Samuel Dylan Webb, Kingston (CA); Yan-Fei Liu, Kingston (CA)

(*) Notice: Subject to any disclaimer, the term of this patent is extended or adjusted under 35 U.S.C. 154(b) by 165 days.

(21) Appl. No.: 16/576,995

(22) Filed: Sep. 20, 2019

(65) Prior Publication Data

US 2020/0099302 A1  Mar. 26, 2020

Related U.S. Application Data

(60) Provisional application No. 62/733,942, filed on Sep. 20, 2018.

(51) Int. Cl.
| | |
|---|---|
| *H02M 3/07* | (2006.01) |
| *H02M 3/158* | (2006.01) |
| *H02M 1/08* | (2006.01) |
| *H02M 1/00* | (2006.01) |

(52) U.S. Cl.
CPC ......... *H02M 3/1582* (2013.01); *H02M 1/083* (2013.01); *H02M 3/07* (2013.01); *H02M 2001/007* (2013.01); *H02M 2001/008* (2013.01)

(58) Field of Classification Search
CPC ...... H02M 3/1582; H02M 3/157; H02M 3/07; H02M 1/083; H02M 2001/0067; H02M 2001/007; H02M 2001/008
See application file for complete search history.

(56) References Cited

U.S. PATENT DOCUMENTS

| | | | |
|---|---|---|---|
| 10,003,261 B2* | 6/2018 | Petersen | H02M 3/07 |
| 2011/0234000 A1* | 9/2011 | Yan | H02M 3/157 |
| | | | 307/31 |
| 2016/0033988 A1* | 2/2016 | Voorwinden | H02M 3/07 |
| | | | 323/300 |
| 2018/0026518 A1* | 1/2018 | Liu | F02M 35/10078 |

* cited by examiner

*Primary Examiner* — Kyle J Moody
*Assistant Examiner* — Jye-June Lee

(57) ABSTRACT

A multi-stage, multi-level DC-DC step-down converter includes a first stage and a second stage having two identical cells connected in parallel. The first stage includes an input capacitor, four switches, and one flying capacitor. The two cells of the second stage each include four switches and one flying capacitor, and an output filter. The cells of the second stage are driven at half the switching frequency of the input stage, and provides a step-down ratio of 4:1. A third stage having four cells may be added to achieve a step-down ratio of 8:1, a fourth stage having eight cells may be added to achieve a step-down ration of 16:1, etc., each additional stage including a doubling of the number of cells connected in parallel, with all cells being substantially identical, and each stage operating at a further reduced fraction of the switching frequency. Embodiments are particularly suitable for applications such as a 48V intermediate bus architecture for servers and datacenters.

15 Claims, 18 Drawing Sheets

ZERO INDUCTOR VOLTAGE CONVERTER TOPOLOGY WITH IMPROVED SWITCH UTILIZATION

RELATED APPLICATION

This application claims the benefit of the filing date of Application No. 62/733,942 filed on Sep. 20, 2018, the contents of which are incorporated herein by reference in their entirety.

FIELD

This invention relates generally to power converters. More specifically, the invention relates to zero inductor voltage DC-DC converters that provide voltage step-down ratios of 4:1, or greater, such as 8:1 or 16:1, with high efficiency, reduced component count, and without the need for complex control.

BACKGROUND

Datacenters and servers are among of the largest consumers of electrical power today. Currently, the information and Communication Technology (ICT) sector consumes approximately 7% of the world's electricity, and this number is projected to rise to 13% by 2030. With advances in cloud computing, and the massive expansion of the use of internet services worldwide, datacenters are expected to be one of the fastest growing consumers of electricity within the ICT sector, increasing by up to 20% per year. In 2017 there were 8.4 billion "internet of things" connected devices. This is expected to rise to over 20 billion devices by 2020, as over 1 billion new internet users are expected to emerge during that time, growing from 3 billion to over 4 billion.

Datacenter architecture has evolved over time, and significant gains have been realized at the building level power conversion steps, however, most of the power loss still occurs at the server power supply unit (PSU) and board-level voltage regulators.

Google's approach has been to implement a 48 volt power architecture. In this architecture the server PSU distributes 48 volts throughout the server rack, which is then converted to the voltage required at the point of load (POL). Google has estimated that this change can reduce conversion losses 30%, as well as offering a 16× reduction in distribution losses throughout the rack (X. Li and S. Jiang. "Google 48V Power Architecture", presented at the 2017 *IEEE Applied Power Electronics Conference and Exposition (APEC)*, Tampa, Fla., USA, 2017). Overall this has the potential to greatly reduce cost and improve both efficiency and flexibility. However, the 48 volt to POL conversion can be very challenging, particularly for low voltage high current loads such as modern processors. For a conventional buck converter, the inductance value required for the output filter is directly proportional to the voltage step-down ratio. Therefore, increasing the step-down ratio, such as in 48V to 1V applications, results in an extremely large inductor requirement, resulting in a very bulky, inefficient converter using conventional single-stage techniques.

The most common approach is to utilize a two-stage conversion approach, such as the intermediate Bus Architecture, to achieve this stepdown at high efficiency. Such techniques utilize a bus converter to reduce the voltage by some fixed ratio near the point of load, reducing the step-down requirement for the point of load converter, allowing it to achieve improved performance.

SUMMARY

Described herein are multi-stage, multi-level DC-DC step-down converters based on a zero inductor voltage converter that achieve superior utilization of the first stage switches and flying capacitor, while also achieving interleaving on the input capacitor. Embodiments may include a first stage, which is the input stage, and a second stage having two identical cells connected in parallel. The first stage includes an input capacitor, four switches, and one flying capacitor. The two cells of the second stage each include four switches and one flying capacitor, and an output filter (e.g., an inductor-capacitor filter). The cells of the second stage are driven at half the switching frequency of the input stage. Such an embodiment achieves a step-down ratio of 4:1. In other embodiments a third stage may be added to achieve a step-down ratio of 8:1, a fourth stage may be added to achieve a step-down ration of 16:1, etc., each additional stage including a doubling of the number of cells connected in parallel, with all cells being substantially identical (i.e., each cell including four switches and one flying capacitor, before the output LC filter), and each stage operating at a further reduced fraction of the switching frequency. Thus, by adding additional stages, the embodiments can achieve $2^n$:1 stepdown, wherein n is the stage number. Embodiments are particularly suitable for applications such as a 48V intermediate bus architecture for servers and datacenters. Compared with previous designs, the embodiments described herein achieve higher efficiency and superior power density, and low component count, without the need for complex control or sensitive resonant based design.

According to one aspect of the invention there is provided a DC-DC converter, comprising: first and second input terminals for receiving an input DC voltage, the second input terminal connected to a circuit common point; a first stage comprising first, second, third, and fourth switches connected together in series between the first and second input terminals, a first flying capacitor connected in parallel with the second and third switches, and a first stage output point between the second and third switches; a second stage connected to the first stage output point, the second stage comprising first and second cells connected together in parallel; wherein each cell comprises first, second, third, and fourth switches connected together in series between an input terminal and a circuit common point, a flying capacitor connected in parallel with the second and third switches, and an output point between the second and third switches; an output filter connected to output points of the first and second cells; wherein an output voltage of the DC-DC converter is about 0.25× the input voltage.

In various embodiments the DC-DC converter may comprise a controller that provides switching signals to the switches of the first and second stages.

In one embodiment, a switching frequency provided to the second stage switches is half the switching frequency provided to the first stage switches.

In one embodiment, the first stage switching signals provided to the first and third switches are 180 degrees out of phase with the switching signals provided to the second and fourth switches; and for each of the first and second cells, the switching signals provided to first and third switches are 180 degrees out of phase with the switching signals provided to the second and fourth switches; and the first and second cells are operated 180 degrees out of phase with each other.

In one embodiment, the first stage comprises an input capacitor connected between the first and second input terminals.

In various embodiments, the switches may be IGBTs with parallel diodes or MOSFETs.

In one embodiment, there is provided a third stage connected to the output points of the cells of the second stage; wherein the third stage comprises four cells connected together in parallel; wherein each cell comprises first, second, third, and fourth switches connected together in series between an input terminal and a circuit common point, a flying capacitor connected in parallel with the second and third switches, and an output point between the second and third switches; wherein the output filter is connected to output points of the four cells of the third stage; wherein an output voltage of the DC-DC converter is about 0.125× the input voltage.

Such an embodiment may comprise a controller that provides switching signals to the switches of the first, second, and third stages; wherein a switching frequency provided to the third stage switches is half the switching frequency provided to the second stage switches; wherein a switching frequency provided to the second stage switches is half the switching frequency provided to the first stage switches.

In one embodiment, the converter is implemented in a power supply architecture with point of load (POL) voltage conversion.

In one embodiment, the input DC voltage is about 48 V.

Another aspect of the invention provides a method for implementing a DC-DC converter, comprising: providing a first stage that receives an input DC voltage, the first stage comprising first, second, third, and fourth switches connected together in series between the first and second input terminals, a first flying capacitor connected in parallel with the second and third switches, and a first stage output point between the second and third switches; providing a second stage connected to the first stage output point, the second stage comprising first and second cells connected together in parallel, wherein each cell comprises first, second, third, and fourth switches connected together in series between an input terminal and a circuit common point, a flying capacitor connected in parallel with the second and third switches, and an output point between the second and third switches; controlling the switches of the first and second stages, wherein a switching frequency provided to the second stage switches is half a switching frequency provided to the first stage switches; wherein an output voltage of the DC-DC converter is about 0.25× the input voltage.

In one embodiment, first stage switching signals provided to the first and third switches are 180 degrees out of phase with switching signals provided to the second and fourth switches; and for each of the first and second cells, switching signals provided to first and third switches are 180 degrees out of phase with switching signals provided to the second and fourth switches; and the first and second cells are operated 180 degrees out of phase with each other.

In one embodiment, the method comprises providing a third stage connected to the output points of the cells of the second stage; wherein the third stage comprises four cells connected together in parallel, and each cell comprises first, second, third, and fourth switches connected together in series between an input terminal and a circuit common point, a flying capacitor connected in parallel with the second and third switches, and an output point between the second and third switches; controlling the switches of the first, second, and third stages, wherein a switching frequency provided to the third stage switches is half the switching frequency provided to the second stage switches, and the switching frequency provided to the second stage switches is half the switching frequency provided to the first stage switches; wherein an output voltage of the DC-DC converter is about 0.125× the input voltage.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

As used herein, the term "switch" is intended to refer to a semiconductor transistor device which can block current flow in one direction when turned off, such as an insulated gate bipolar transistor (IGBT) with a parallel diode, or a MOSFET where the parallel diode is inherent.

Figure 1A:
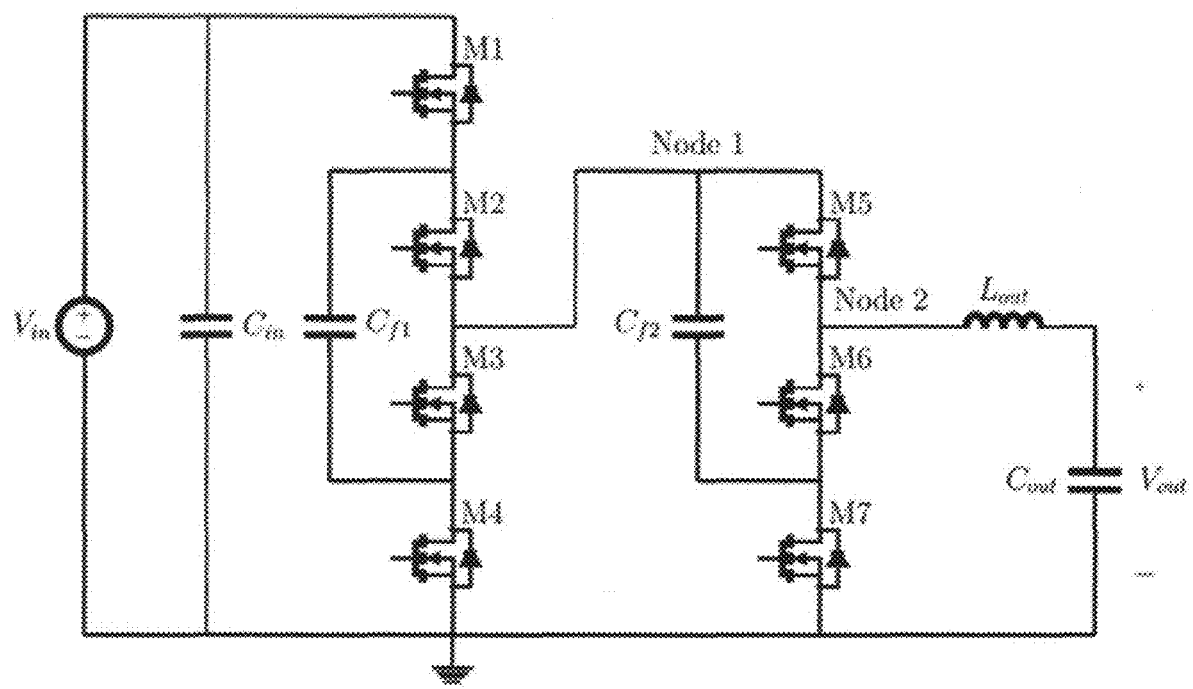
FIG. 1A is a schematic diagram of a 7-switch zero inductor voltage (ZIV) converter, according to the prior art.
Figure 1B:
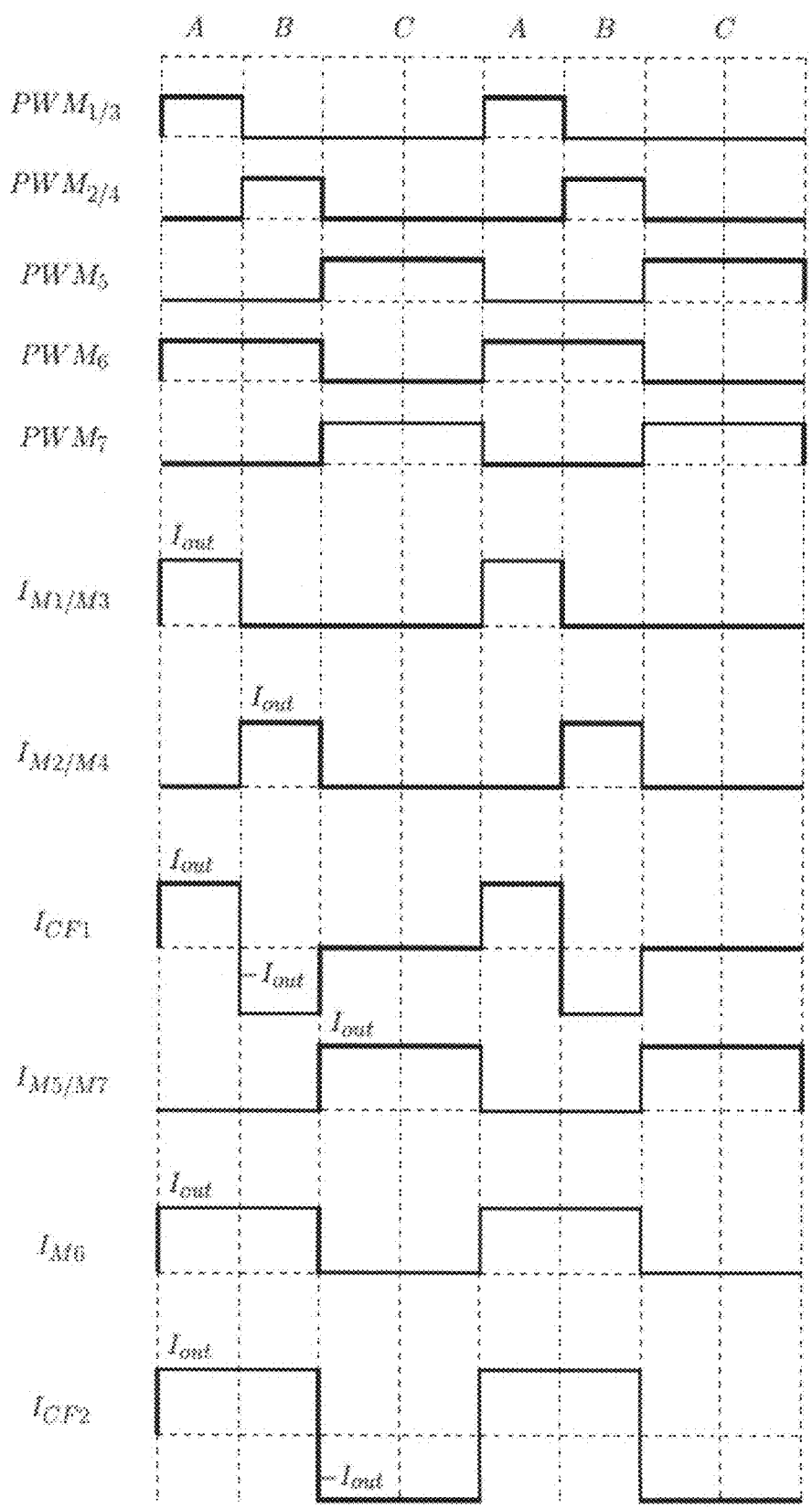
FIG. 1B is a pulse width modulation (PWM) timing diagram for the 7-switch ZIV converter of FIG. 1A, according to the prior art.
Figure 2:
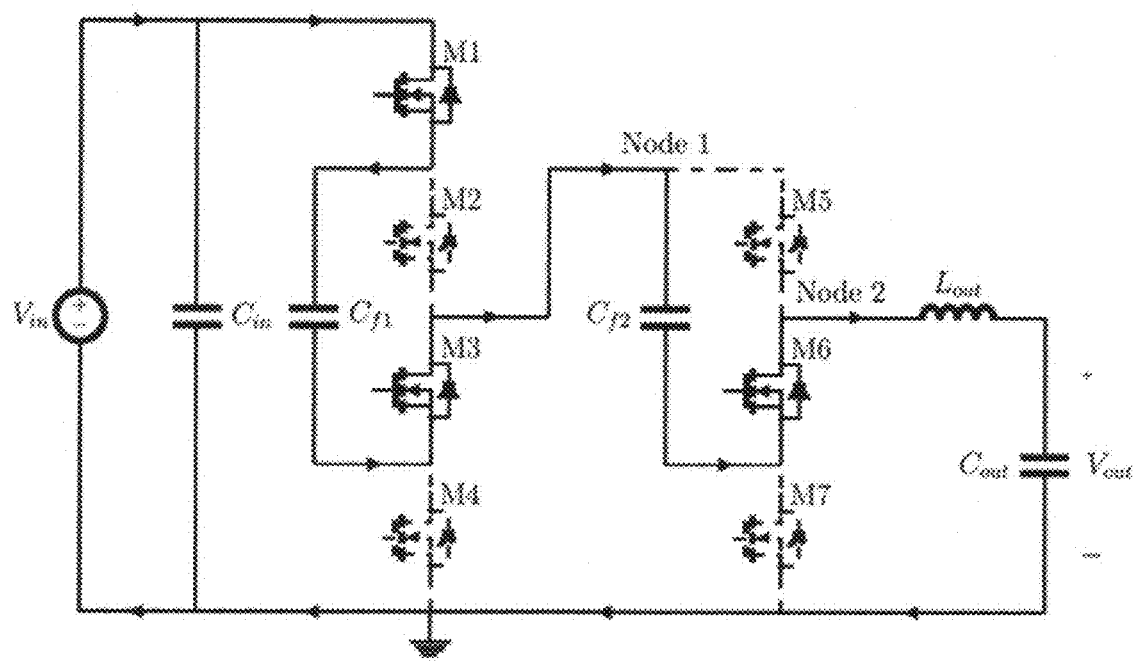
FIGS. 2-4 are circuit diagrams showing States A, B, and C, respectively, of the 7-switch ZIV converter of FIG. 1A, wherein portions of the circuits shown in dashed lines do not operate during respective States, according to the prior art.
Figure 3:
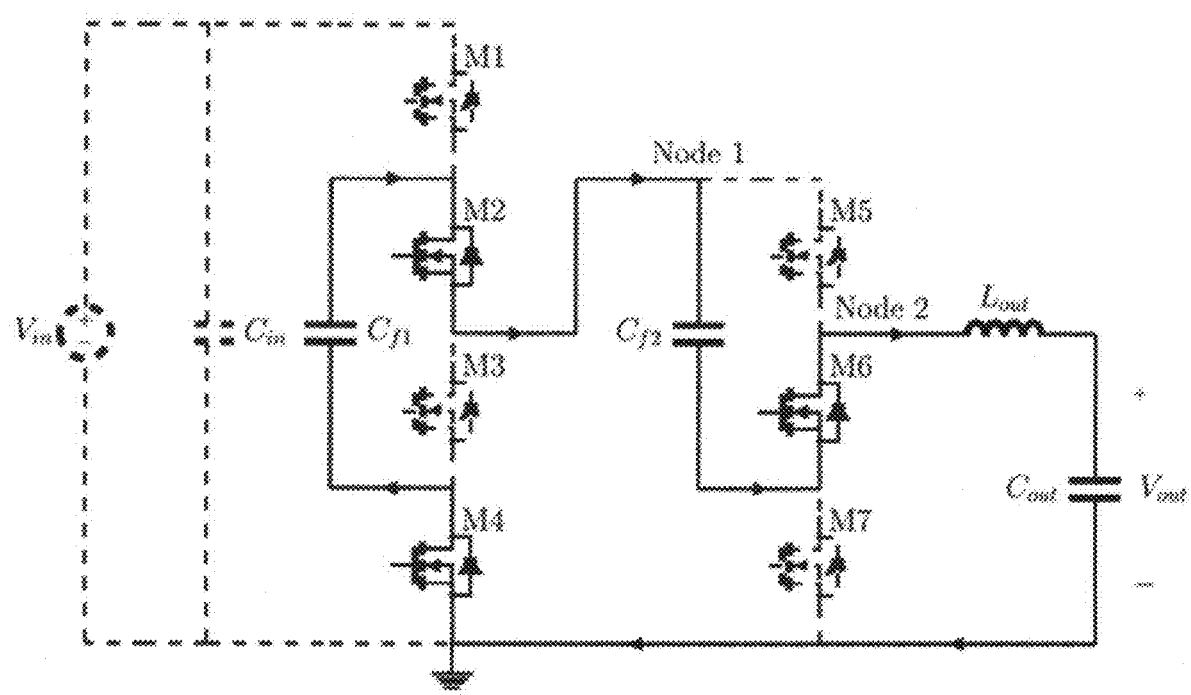
Figure 14A:
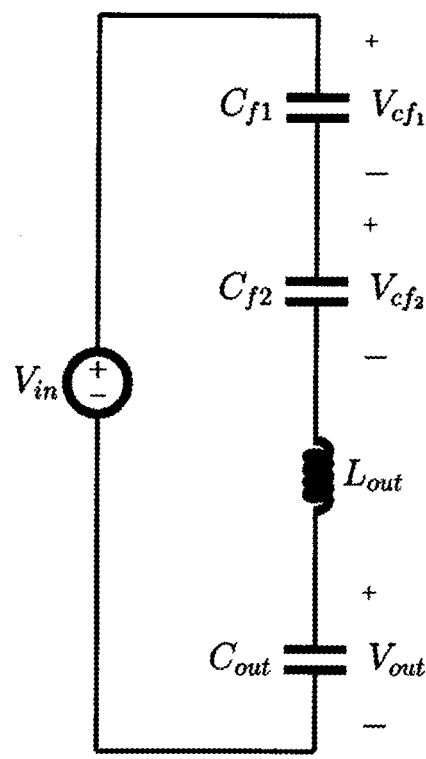
FIGS. 14A-14C are circuit diagrams showing equivalent circuits of the 12-switch ZIV converter during operating states I-IV.

The conventional 7-switch zero inductor voltage (ZIV) converter operates using seven switches as shown in FIG. 1A. The PWM scheme for this converter is shown in FIG. 1B. This PWM scheme results in three operating states for the converter, shown in FIGS. 2-4. In State A, switches M1, M3, and M6 are turned on with the remaining switches turned off. Both flying capacitors are charging in this state. The converter equivalent circuit for State A is shown in FIG. 14A, and the inductor voltage is represented by Equation 11. This state lasts for 25% of the overall switching period.

Figure 14B:
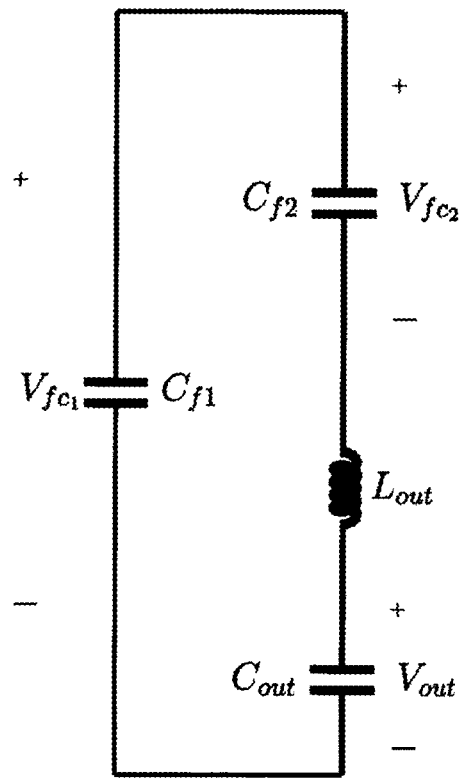

In State B switches M2, M4, and M6 are turned on, with the remaining switches turned off. The first stage flying capacitor is now discharging, while the second stage flying capacitor continues to charge. The converter equivalent circuit for State B is represented in FIG. 14B, and the inductor voltage is represented by Equation 12. This state lasts for 25% of the overall switching period.

Figure 14C:
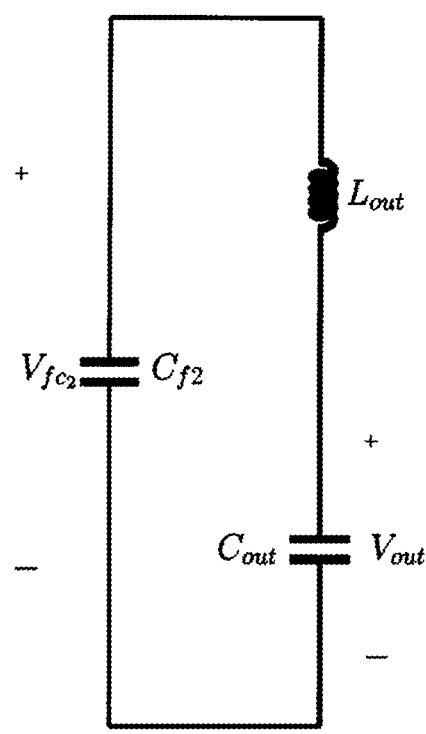

In State C switches M5 and M7 are turned on, with the remaining switches turned off. The second stage flying capacitor is now discharging. The converter equivalent circuit for State C is represented in FIG. 14C, and the inductor voltage is represented by Equation 13.

Figure 7:
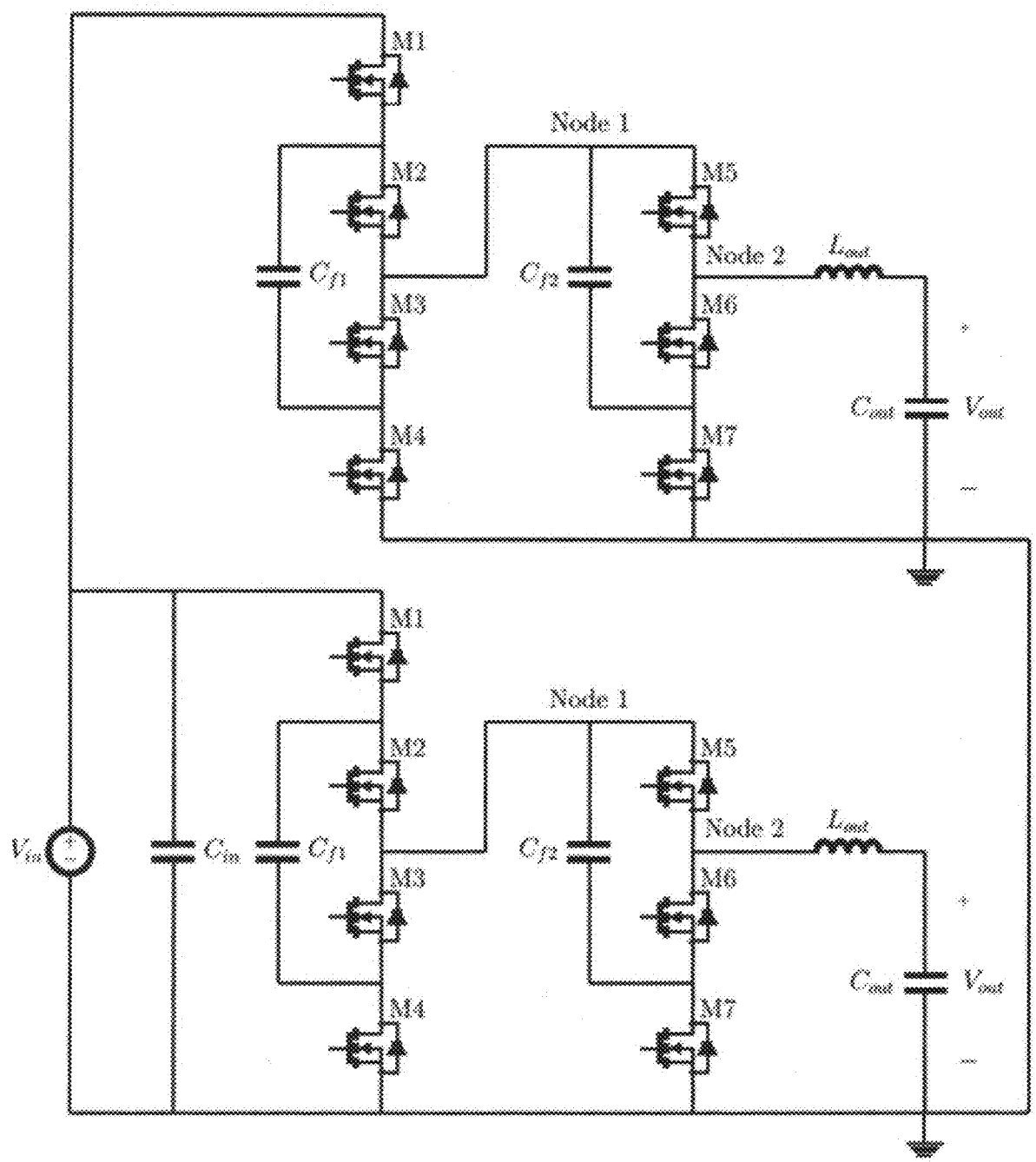
FIG. 7 is a schematic diagram of a two-phase 7-switch ZIV converter, according to the prior art.

The 7-switch ZIV converter achieves 4:1 stepdown, as shown by Equation 17, and provides an unregulated output voltage. In order to increase the power handling capability, it can be desirable and is a well-known technique to parallel multiple "phases" of the converter. A two-phase 7-switch ZIV converter is shown in FIG. 7. The key reason for doing this is to achieve higher output current for the same efficiency level by utilizing multiple phases, however, an additional advantage can be realized by using two or more phases in a ZIV converter, with interleaving of the input capacitor. In a 7-switch ZIV converter M1 operates with 25% duty cycle, the input capacitor RMS current is given by:

$$I_{cRMS} = \sqrt{\left(\frac{3}{4}I_{out}\sqrt{0.25}\right)^2 + \left(\frac{1}{4}I_{out}\sqrt{0.75}\right)^2} = \frac{\sqrt{3}}{4}I_{out} \quad (1)$$

Figure 5:
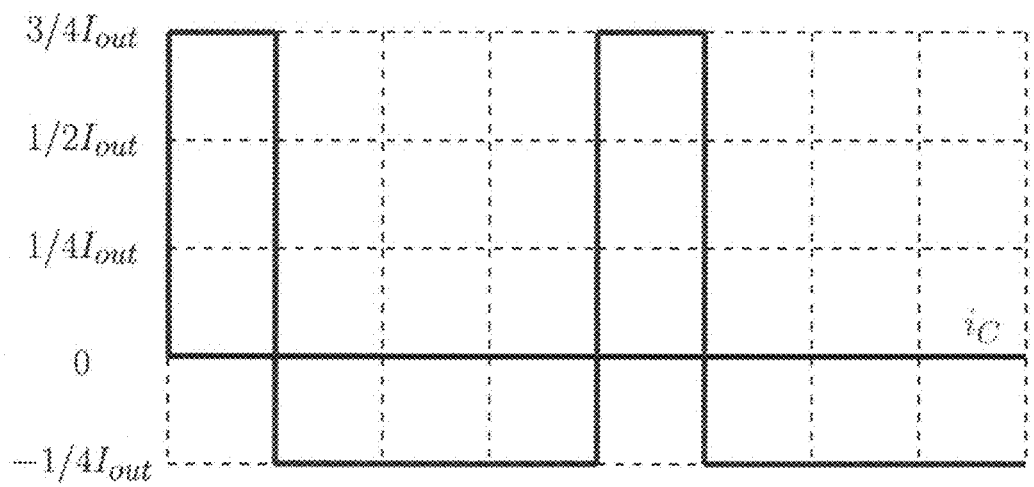
FIG. 5 is a diagram showing the input capacitor current waveform for the 7-switch ZIV converter of FIG. 1A, according to the prior art.

FIG. 5 shows the input capacitor current waveform for the 7-switch ZIV converter.

Figure 6:
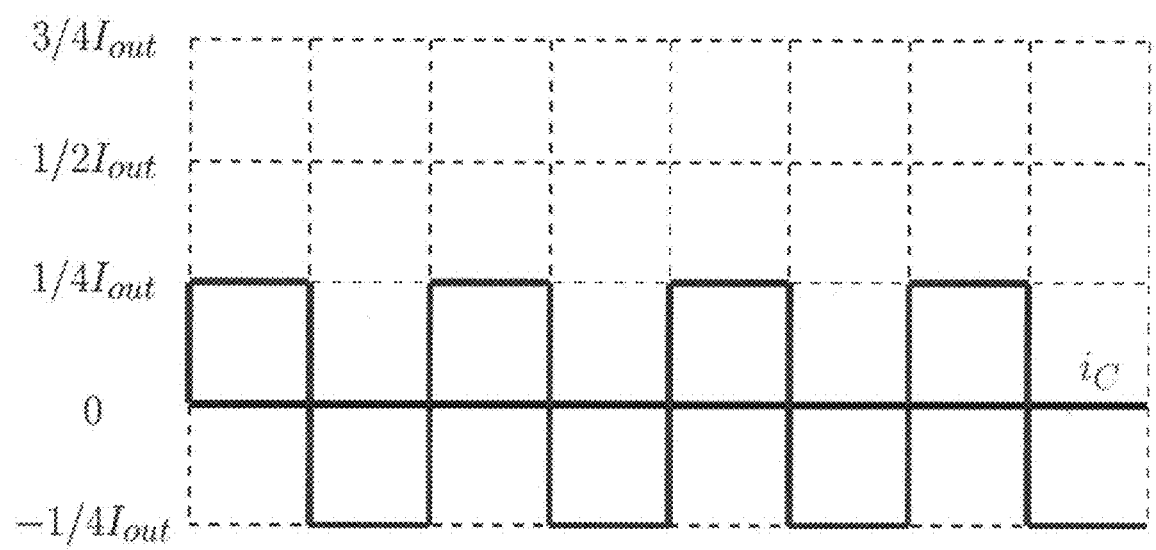
FIG. 6 is a diagram showing the input capacitor current waveform with 50% duty cycle interleaving, for a two-phase 7-switch ZIV converter, and for a 12-switch ZIV converter as described herein.

For a two-phase 7-switch ZIV converter, as shown in FIG. 7, the input capacitor RMS current can be significantly reduced if the two phases are operated 180 degrees out of phase. Due to this interleaving, the input capacitor current becomes a square wave with an amplitude of ¼ of the output current, alternating between discharging at ¼ of the output current for 25% of a converter switching period, charging at ¼ of the output current for the next 25% of a converter switching period, then again discharging and charging for the remainder of the switching period, as shown in FIG. 6. This can be understood by examining how the input capacitor must make up the difference between the current drawn from the input supply, and the output current. For a 4:1 stepdown, the current drawn from the input supply is approximately ¼ of the load current. Therefore, for two phase operation, the input capacitor must supply the additional ¼ of the load current to cause ½ of the load current to flow through the first phase (note that for two-phase operation only one phase will be drawing energy from the input supply at any one time). After 25% of the duty cycle, M1 for the first phase will turn off, and the capacitor will now be charged by the ¼ of the load current from the input supply for the next 25% of the switching period. Next, M1 for the second phase will turn on. In this case the input capacitor must once again supply the ¼ of the load current not provided by the input supply for 25% of the switching period. The input capacitor will then be charged at ¼ of the load current for the remaining 25% of the switching period.

In this way, the RMS current for a two-phase 7-switch ZIV converter becomes:

$$I_{cRMS(2-Phase)} = \frac{1}{4}I_{out} \quad (2)$$

Therefore, achieving interleaving reduces the input capacitor ESR losses by a factor of 3 for the two-phase 7-switch ZIV converter, in addition to achieving higher output current capability.

In the standard 7-switch ZIV converter topology the first-stage switches (M1-M4) operate with only 25% duty cycle. This causes relatively large RMS current stress through the MOSFETs, input capacitor, and first stage flying capacitor. In the two-phase 7-switch ZiV converter the interleaving on the input capacitor has an "apparent" 50% duty cycle, but the MOSFETs and flying capacitors still operate at only 25% duty cycle.

Figure 8:
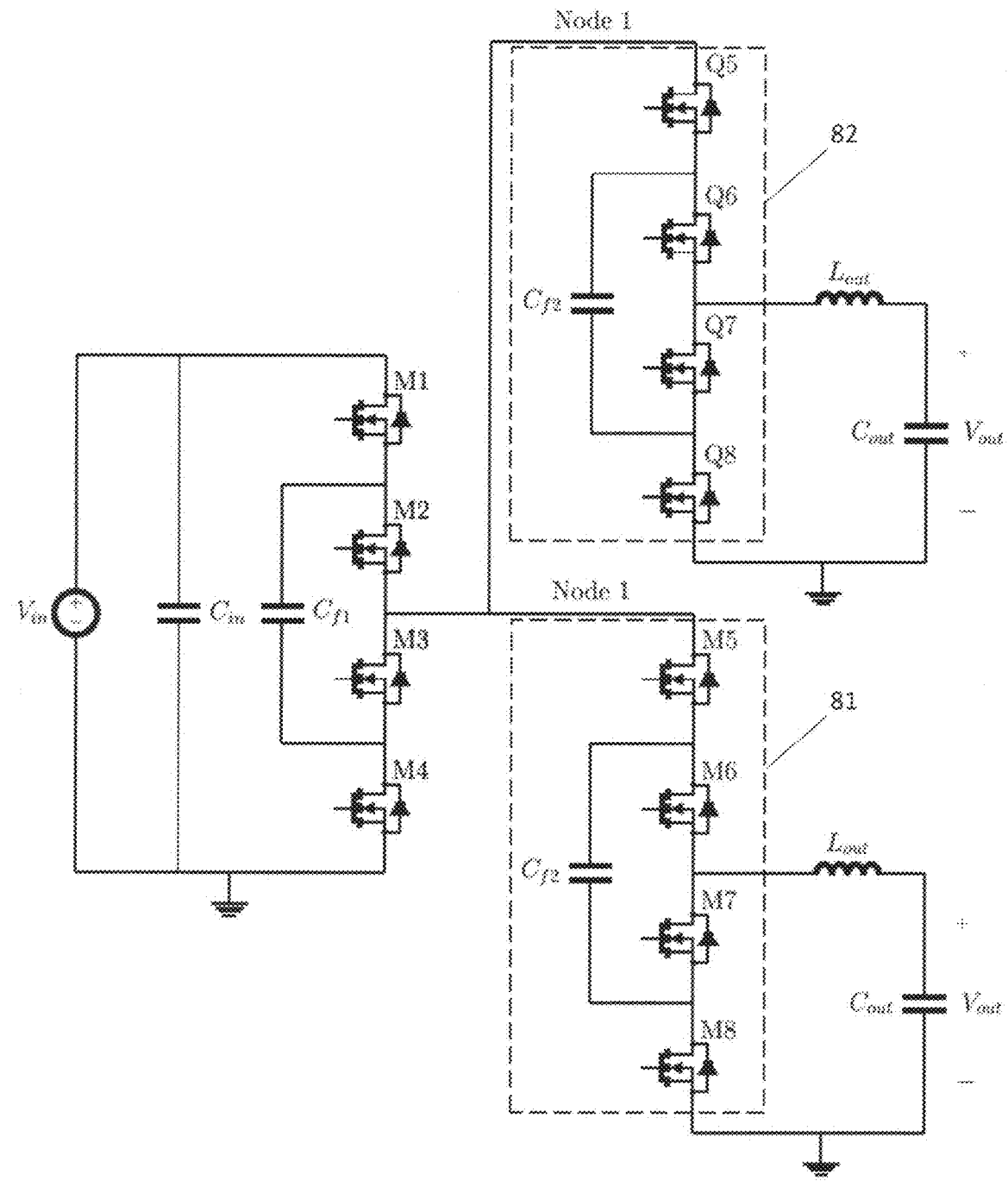
FIG. 8 is a schematic diagram of a 12-switch ZIV converter, according to one embodiment.
Figure 9:
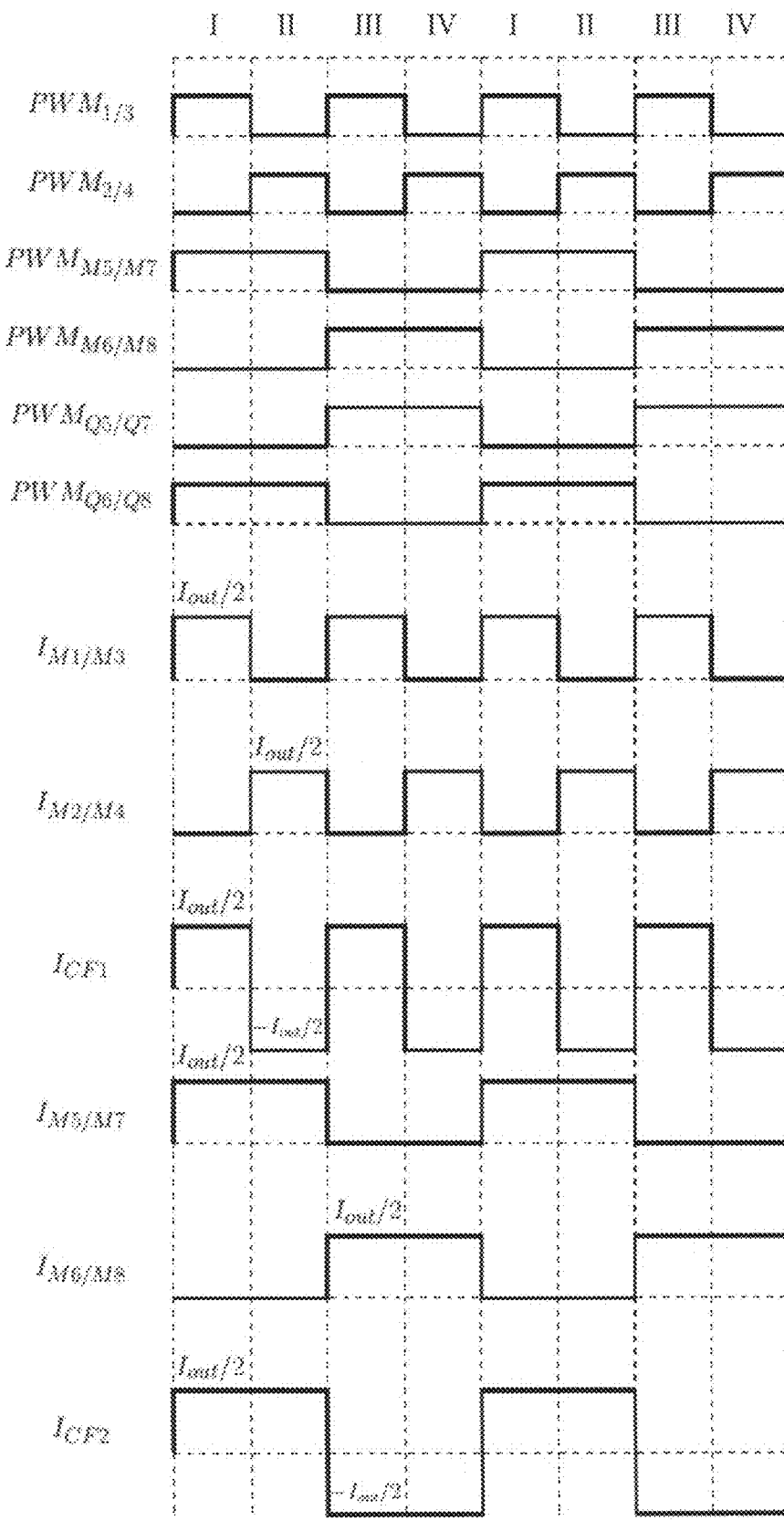
FIG. 9 is a diagram showing PWM timing and current waveforms for the 12-switch ZIV converter of FIG. 8, according to one embodiment.
Figure 10:
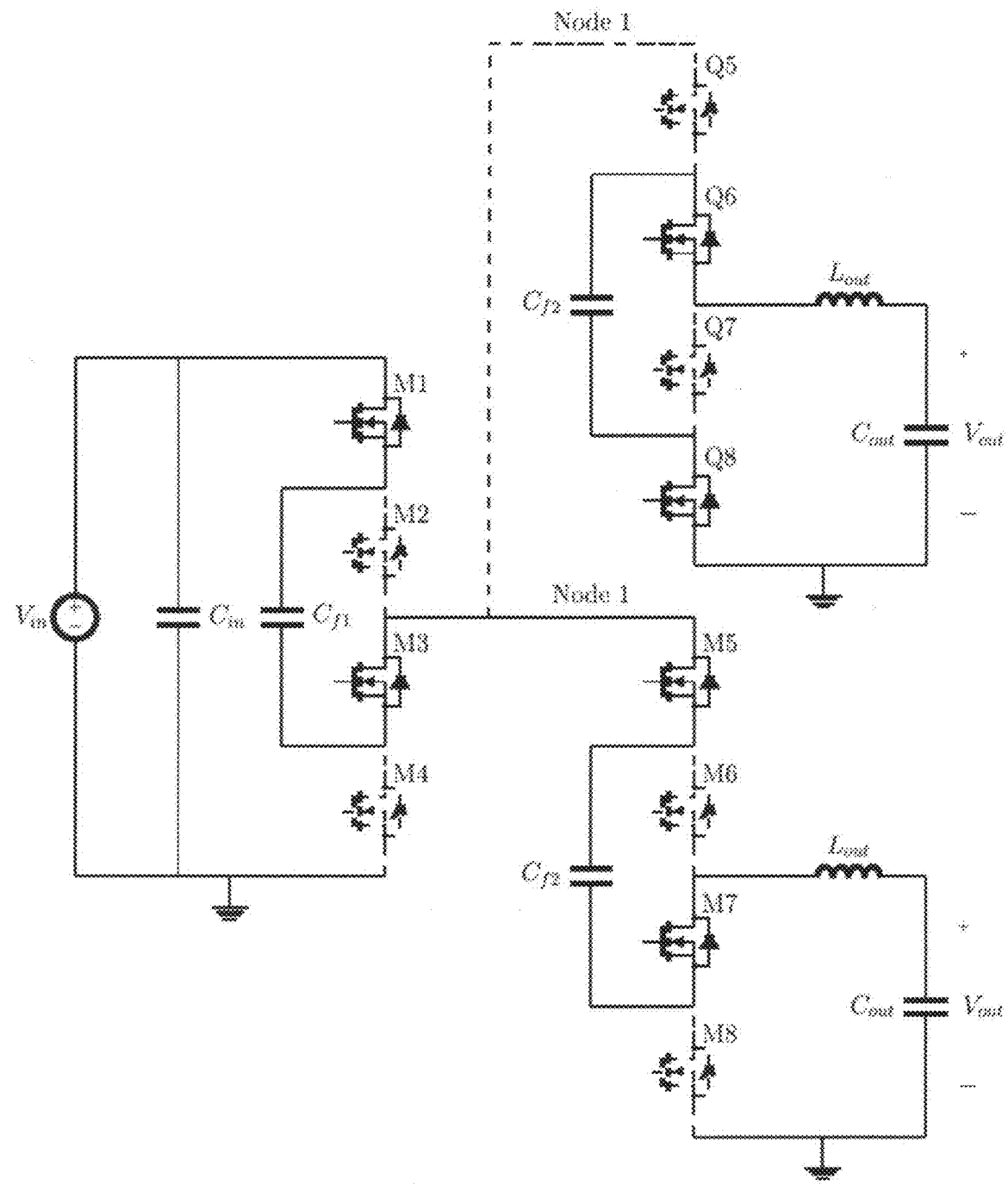
FIGS. 10-13 are circuit diagrams showing States A, B, C, and D respectively, of the 12-switch ZIV converter of FIG. 8, wherein portions of the circuits shown in dashed lines do not operate during respective States, according to one embodiment.
Figure 11:
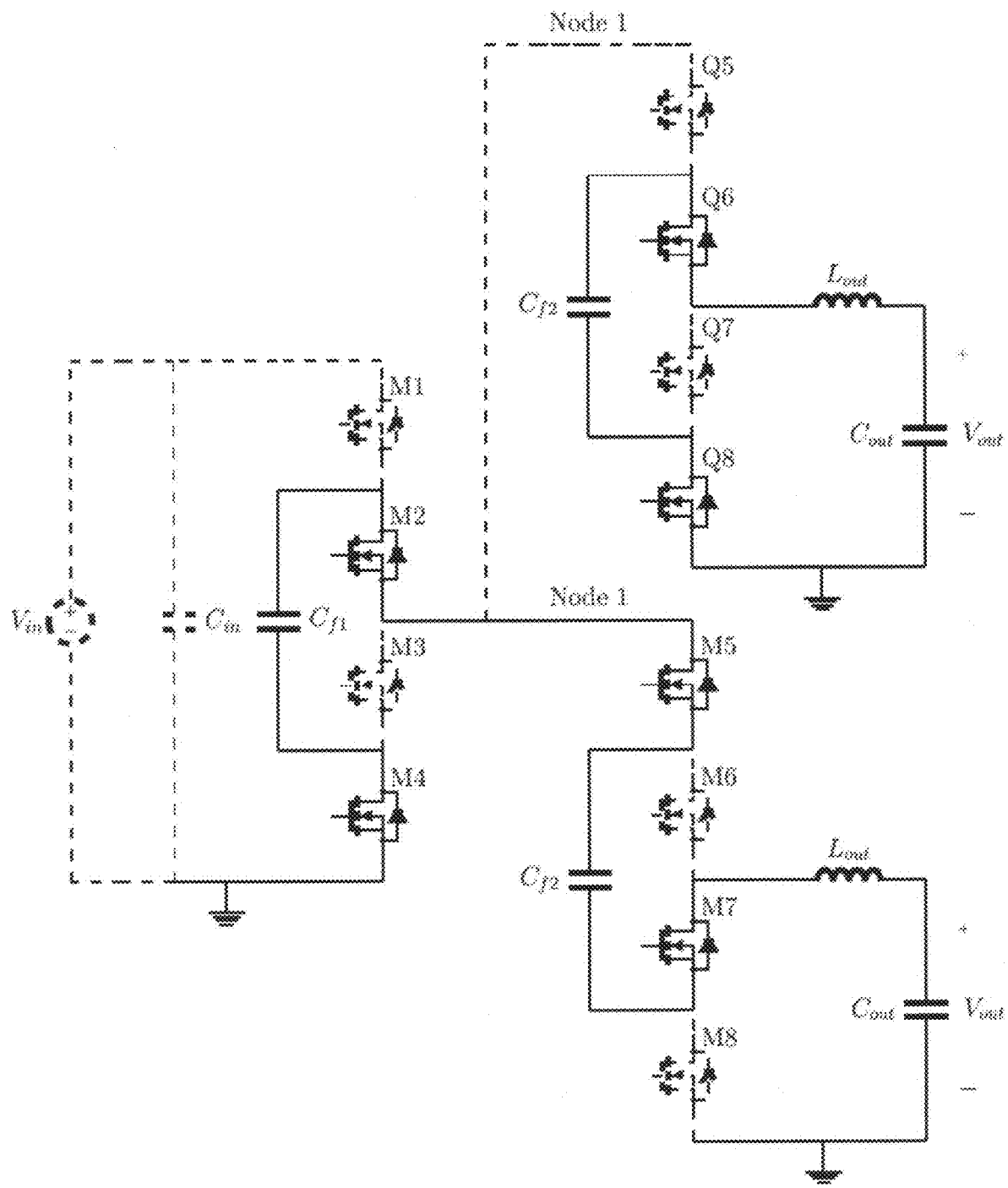
Figure 12:
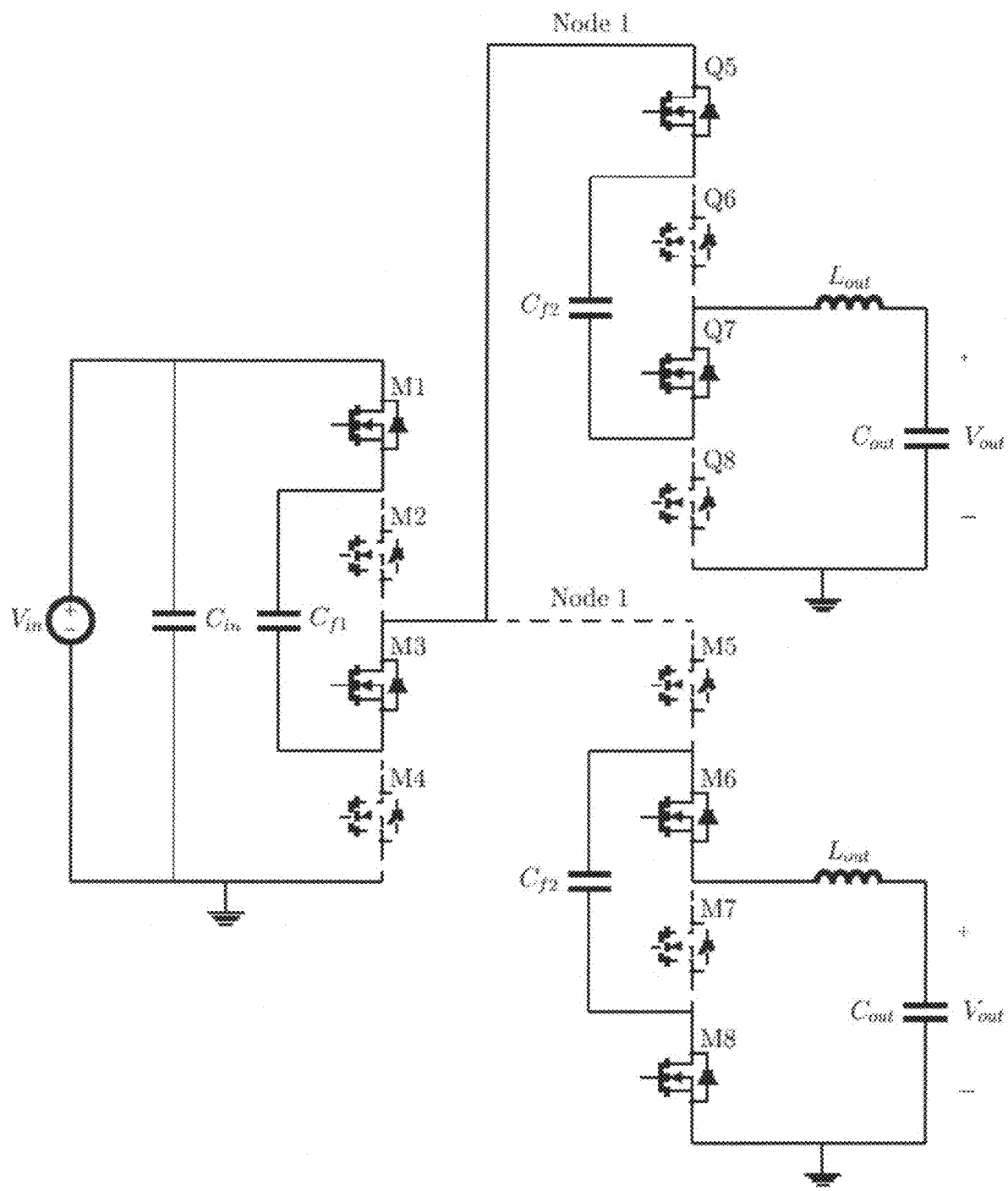
Figure 13:
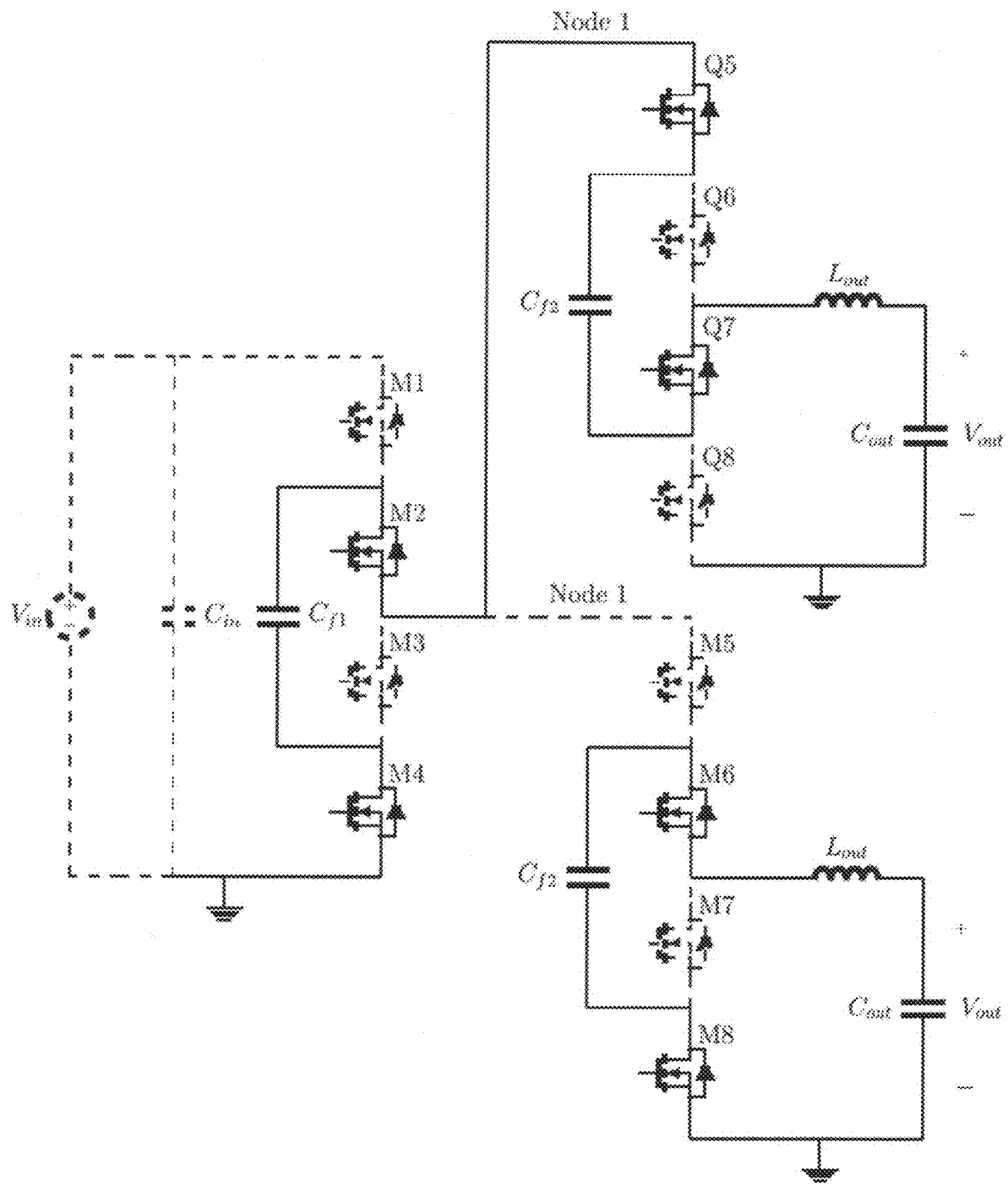

A 12-switch ZIV converter as described herein incorporates features of the 7-switch ZIV converter, but provides considerable improvements in performance and switch utilization. An embodiment is shown in FIG. 8, and a PWM gate timing diagram for this embodiment is shown in FIG. 9. According to this embodiment, a 12-switch ZIV converter has an input or first stage including four switches and a flying capacitor, an output point "Node 1", and a second stage including two cells 81, 82, shown within dashed lines, in parallel, wherein each cell includes four switches, a flying capacitor, and an output point. In the embodiment of FIG. 8, the first cell 81 has switches M5-M8, and the second cell 82 has switches Q5-Q8. This results in significant component savings and size reduction compared to a two-phase 7-switch ZIV converter with 14 switches, while also offering greatly improved efficiency when compared with a single-phase 7-switch ZIV converter.

Operation of this embodiment, and realization of the component reduction, may be understood by examining the two-phase 7-Switch ZIV converter, shown in FIG. 7, with each phase operating in parallel with a 180 degree phase shift between them. Note that in this standard two-phase topology, each phase has a first stage with switches M1-M4, and the first stage switches M1-M4 will be inactive for 50% of the total converter cycle during State C (for both phases), as shown in FIG. 7.

Instead of having two first stages each operating for only 50% of the total cycle, a 12-switch ZIV converter as described herein has only a single first stage, as can be seen in the embodiment of FIG. 8. The single first stage is driven at double the frequency (compared to the two-phase 7-switch ZIV converter). When one of the second phase cells enters State C, the additional MOSFET M5 or Q5 blocks the voltage at Node 1 from being pulled down to the output voltage. This allows a single input stage to function for both parallel second stage cells, as the second stage cells are effectively separated by the additional blocking MOSFETs. It is noteworthy that this component count reduction can be achieved without a significant penalty.

To verify the performance of the embodiment of FIG. 8, the analysis below evaluates the RMS current stress of each component for the 7-switch ZIV converter topology, the two-phase 7-switch ZIV converter topology, and the 12-switch ZIV converter topology for the same output current. Note that the analysis below corresponds to the current waveforms shown in FIG. 18 and FIG. 9 for the 7-switch ZIV converter and 12-switch ZIV converter, respectively. For clarity, the current waveforms for the 12-switch ZIV converter in FIG. 9 are shown for only the first phase involving M1-M4 and M5-M8, as the second phase involving M1-M4 and Q5-Q8 will have the same current stress, but phase shifted; that is, the operation of the second stage second cell 82 (Q5-Q8) is the same as the second stage first cell 81 (M5-M8), but it is phase shifted by 180 degrees. It should also be noted that for the two-phase 7-switch ZIV converter the current waveforms are identical to the 7-switch ZIV converter, with each phase carrying half of the output current and phase shifted 180 degrees relative to each other; therefore, a corresponding figure is not provided. This is reflected in the analysis below; the RMS current stress for each component in the two-phase 7-switch ZIV converter is half of the stress for that component in the 7-switch ZIV converter.

Considering the first stage MOSFETs of a 7-switch ZIV converter the total RMS current stress for each MOSFET is given by:

$$I_{RMS(M1-M4)} = \sqrt{0.25}\, I_{out} = \frac{I_{out}}{2} \quad (3)$$

For the first stage flying capacitor, and the second stage MOSFETs M5-M7, the RMS current stress is given by:

$$I_{RMS(FC1,M5-M7)} = \sqrt{0.5}\, I_{out} = \frac{\sqrt{2}}{2} I_{out} \quad (4)$$

For the second stage flying capacitor:

$$I_{RMS(FC2)} = I_{out} \quad (5)$$

For the two-phase 7-switch ZIV converter the current is evenly shared between each phase, therefore for the first stage MOSFETs:

$$I_{RMS(M1-M4)} = \sqrt{0.25}\, \frac{I_{out}}{2} = \frac{I_{out}}{4} \quad (6)$$

For the first stage flying capacitor, and the second stage MOSFETs M5-M7, the RMS current stress will be given by:

$$I_{RMS(FC1,M5-M7)} = \sqrt{0.5}\, \frac{I_{out}}{2} = \frac{\sqrt{2}}{4} I_{out} \quad (7)$$

For the second stage flying capacitor:

$$I_{RMS(FC2)} = \frac{I_{out}}{2} \quad (8)$$

In the twelve-switch ZIV converter the first stage MOSFETs operate at 50% duty cycle, and carry half of the load current for a given on period:

$$I_{RMS(M1-M4)} = \frac{\sqrt{0.5}\, I_{out}}{2} = \frac{\sqrt{2}}{4} I_{out} \quad (9)$$

The first stage flying capacitor operates at 100% duty cycle, charging and discharging at half of the load current for each time:

$$I_{RMS(FC1)} = \frac{I_{out}}{2} \quad (10)$$

In the 12-switch ZIV converter the second stage MOSFETs and flying capacitors operate in the same way as the two-phase 7-switch ZIV converter, and the RMS current for each component is the same as in equations 7 and 8.

In summary, compared with a single phase ZIV converter, the total conduction loss in the first stage for the 12-switch ZIV converter is reduced by a factor of 2 for the same output current, despite not adding any additional components. The RMS current stress of each MOSFET in the second stage, and the second stage flying capacitors, is also reduced to half due to the current sharing, as in a two-phase 7-switch topology. This offers a significant performance improvement over a single phase 7-switch ZIV converter, without requiring a doubling of the component count such as in a two-phase 7-switch ZiV converter. The switching loss for MOSFETs M1-M4 in the 12-switch ZIV converter is the same as a 7-switch ZIV converter for the same output load. This is because while the switching frequency is doubled, the current at the time of switching is halved. The increased frequency also reduces the flying capacitor ripple in the first stage by a factor of 2. The 50% duty cycle operation of the 12-switch ZIV converter also significantly reduces the input capacitor RMS current, compared to a 7-switch ZIV converter. The interleaving achieved by the 12-switch ZIV converter is the same as the two-phase 7-switch ZIV converter; therefore, the input capacitor loss is reduced by a factor of 3 compared with a 7-switch ZIV converter.

As compared with a two-phase 7-switch ZIV converter, the total conduction loss through all the first stage MOSFETs and capacitors will be the same in both the two-phase 7-switch ZIV converter and in the 12-switch ZIV converter. This is because while the two-phase 7-switch ZIV converter has a lower RMS current through each individual MOSFET, the number of first stage MOSFETs is doubled, due to poor switch utilization, meaning the total loss will be the same. While the current stress of the individual second stage components is the same in the 12-switch ZIV converter and the two-phase 7-switch ZIV converter, the 12-switch ZIV converter will have slightly increased losses when compared with the two-phase 7-switch ZIV converter, due to the addition of MOSFETs M5 and Q5 required to block the voltage at Node 1 from being pulled down to the output voltage. However, this will result in only slightly increased loss, with the advantage of a significantly reduced component count (2 fewer MOSFETs and associated driving circuitry and 1 fewer flying capacitor).

Operation

Operation of the embodiment of the 12-switch ZIV converter shown in FIG. 8 will now be described in greater detail with reference to FIGS. 9-13. The embodiment operates in four states, labelled I, II, III, and IV as shown in FIG. 9. FIGS. 10-13 show the current path through the circuit for each operating state; wherein portions of the circuit that do not operate during each state are shown in dashed lines. Each of the operating states can be represented by one of the equivalent circuits of FIGS. 14A-14C.

To explain the operation of the 12-switch ZIV converter, the first "phase" involving only M1-M8 will be considered first. For states I and II, for the phase involving M1-M8, the operation is equivalent to the operation of the 7-switch ZIV converter in FIG. 2 for the first 25% of the duty cycle, and equivalent to the operation in FIG. 3 for the second 25% of the duty cycle. Thus, the equivalent circuits are shown in FIG. 14A for the first 25% of the duty cycle, and in FIG. 14B for the $2^{nd}$ 25% of the duty cycle. The inductor voltages for these states are:

$$V_{LA} = V_{in} - V_{cf1-A} - V_{cf2-A} - V_{out} \quad (11)$$

$$V_{LB} = V_{cf1-B} - V_{cf2-B} - V_{out} \quad (12)$$

Figure 4:
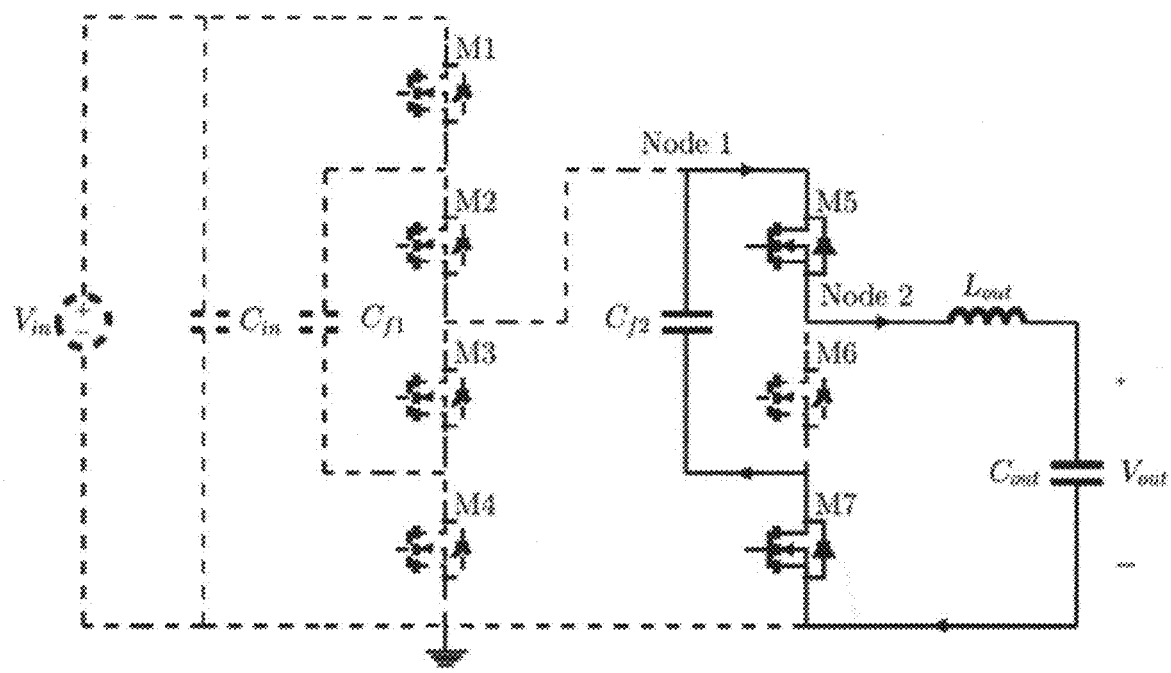

For states III and IV for the first phase involving M5-M8 the operation is equivalent to the operation of the 7-switch ZIV converter shown in FIG. 4 for the remaining 50% of the duty cycle. Thus, the equivalent circuit for this state is shown in FIG. 14C. The inductor voltage for states II and IV is:

$$V_{LC} = V_{cf2-C} - V_{out} \quad (13)$$

The average inductor voltage for the first phase involving M1-M8 can thus be represented as follows:

$$V_L = \frac{V_{in}}{4} - \left(\frac{V_{cf1-A}}{4} + \frac{V_{cf2-B}}{4}\right) - \left(\frac{V_{cf2-A}}{4} - \frac{V_{cf2-B}}{4} + \frac{V_{cf2-C}}{2}\right) - V_{out} \quad (14)$$

Note that the capacitor balance must also be maintained for steady state operation. This means that the average voltage of $C_{f1}$ for state I must be equal to the average voltage of $C_{f1}$ for state II, and the average of $C_{f2}$ across both state I and state II must be equal to the average voltage of $C_{f2}$ across state III/IV. Thus, the equation may be simplified by noting the following:

$$V_{cf1-A} = V_{cf2-B} \quad (15)$$

$$\frac{V_{cf2-A} + V_{cf2-B}}{2} = V_{cf2-C} \quad (16)$$

Under steady state operation the inductor voltage must equal to zero, and as all the capacitor voltage terms cancel out with the above substitutions, there is:

$$V_{out} = \frac{V_{in}}{4} \quad (17)$$

Thus, the 12-switch ZIV converter as shown in the embodiment of FIG. 8 achieves 4:1 voltage step down. The second phase involving M1-M4 and Q5-Q8 operates in a symmetrical way, phase shifted 180 degrees relative to the first phase. M5 and Q5 block the voltage at Node 1 from being pulled down to the output voltage. Therefore the two second stage cells 81 including M5 to M8 and 82 including Q5 to Q8 are separated: while one phase operates in State C (FIG. 14C) with only the second flying capacitor discharging, the other phase operates in States A and B (FIG. 14A and FIG. 14B) where the input stage Is involved. The second phase involving M1-M4 and Q5-Q8 can be represented by the same equivalent circuits (FIGS. 14A-14C) and is governed by the same equations (Equations 11-17). Therefore, it is clear that 4:1 step-down operation is achieved by the 12-switch ZIV topology.

Advantages of the topology over the single phase 7-switch ZIV converter are also highlighted when examining the operation of both phases as a whole; that is, the converter has a much better utilization of switches M1-M4 by operating at 50% duty cycle for these switches, and a much better utilization of $C_{f1}$ which now operates at 100% duty cycle. Additionally, the 50% duty cycle for the first stage switches M1-M4 provides interleaving on the input capacitor, reducing the associated RMS loss by a factor of 3. The 12-switch ZIV converter also possesses the same benefit of current sharing between two phases as the two-phase 7-switch ZIV converter; this greatly increases the current handling capability of the converter compared to a single phase design allowing for improved efficiency to be achieved even if the output current is doubled. Overall, this results in significant performance increase compared with a 7-switch ZIV converter, while also offering a component count reduction compared to a true two-phase 7-switch ZIV converter by allowing for the elimination of two switches (and associated driver circuitry) and one flying capacitor.

Figure 15:
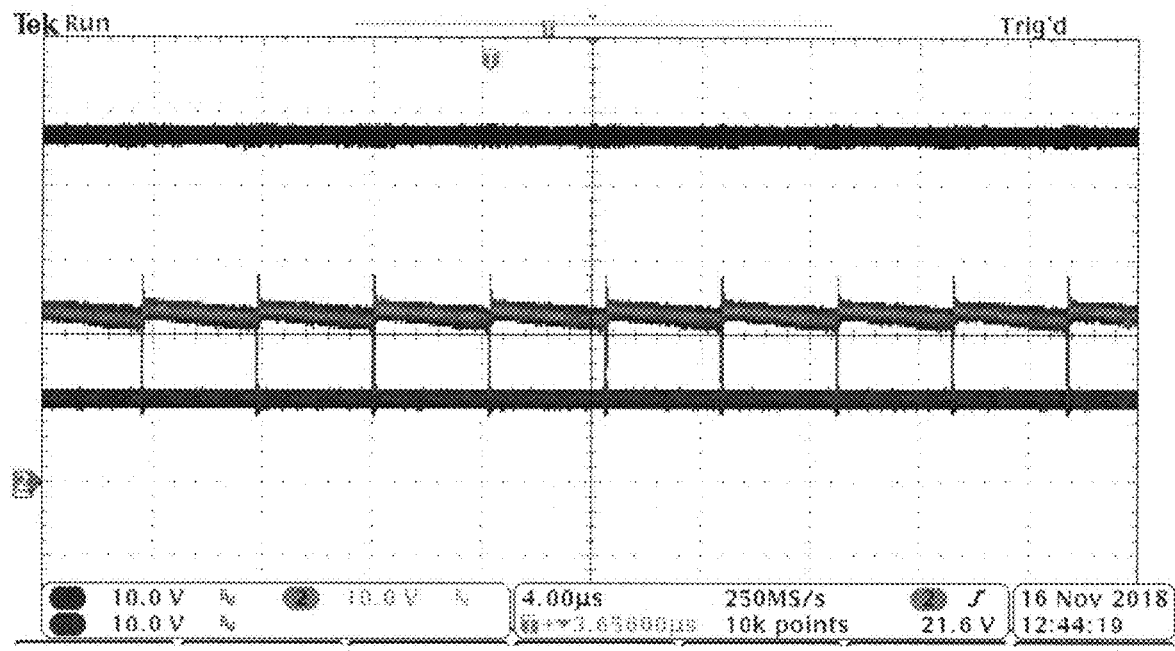
FIGS. 15 and 16 are oscilloscope screen shots showing operating waveforms obtained for a prototype 12-switch ZIV converter, according to one embodiment.
Figure 16:
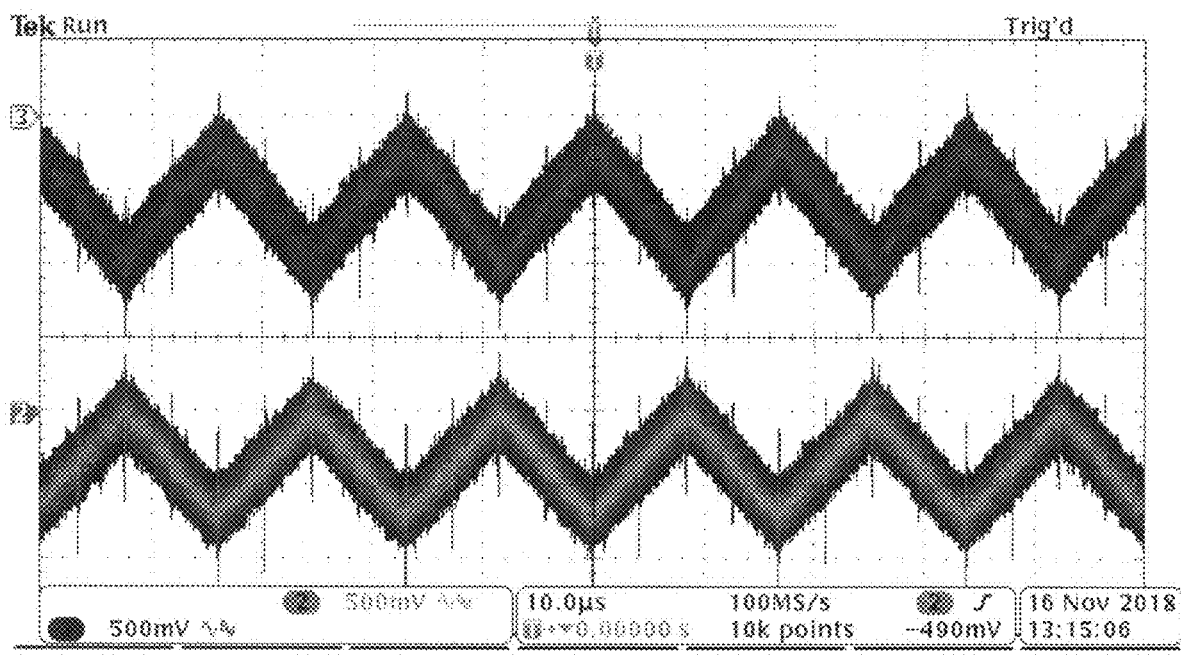

An experimental prototype of a 12-switch ZIV converter was constructed based on the embodiment of FIG. 8, using the components and parameters listed in Table 1, with a load current of 30 A, an input voltage of 48V, and a switching frequency of 120 kHz for M1-M4 and 60 kHz for M5-M8 and Q5-Q8. FIG. 15 is an oscilloscope screen shot that shows the Node 1 voltage waveform as well as the input and output voltage waveforms of the experimental prototype. FIG. 16 is an oscilloscope screen shot that shows the $C_{f2}$ and $C_{f3}$ capacitor ripple voltages. The waveforms verify that current is shared evenly between the phases, as the flying capacitor ripple is proportional to the output current of each phase, and 4:1 stepdown operation is achieved as suggested by the above analysis.

TABLE 1

| 12 Switch ZIV Converter Prototype Parameters | |
|---|---|
| $C_{in}$ | 15 × 4.7 uF 100 V X7S 1210 |
| $C_{f1}$ | 16 × 10 uF 50 V JB 1206 |
| $C_{f2}$, $C_{f3}$ | 9 × 47 uF 25 V XSR 1210 |
| $C_{out}$ | 12 × 47 uF 25 V X5R 1210 |
| L1, L2 | 230 nH SLR1075-231KE |
| M1-M4 | 30 V BSC011N03LSI |
| M5-M8, Q5-Q8 | 25 V BSC009NE2LSSI |
| Switching Frequency | 120 kHz (M1-M4) 60 kHz (M5-M8, Q5-Q8) |
| Input Voltage | 48 V |
| Output Current (Maximum) | 70 A |

Two-Phase 12-Switch ZIV Converter

Figure 17:
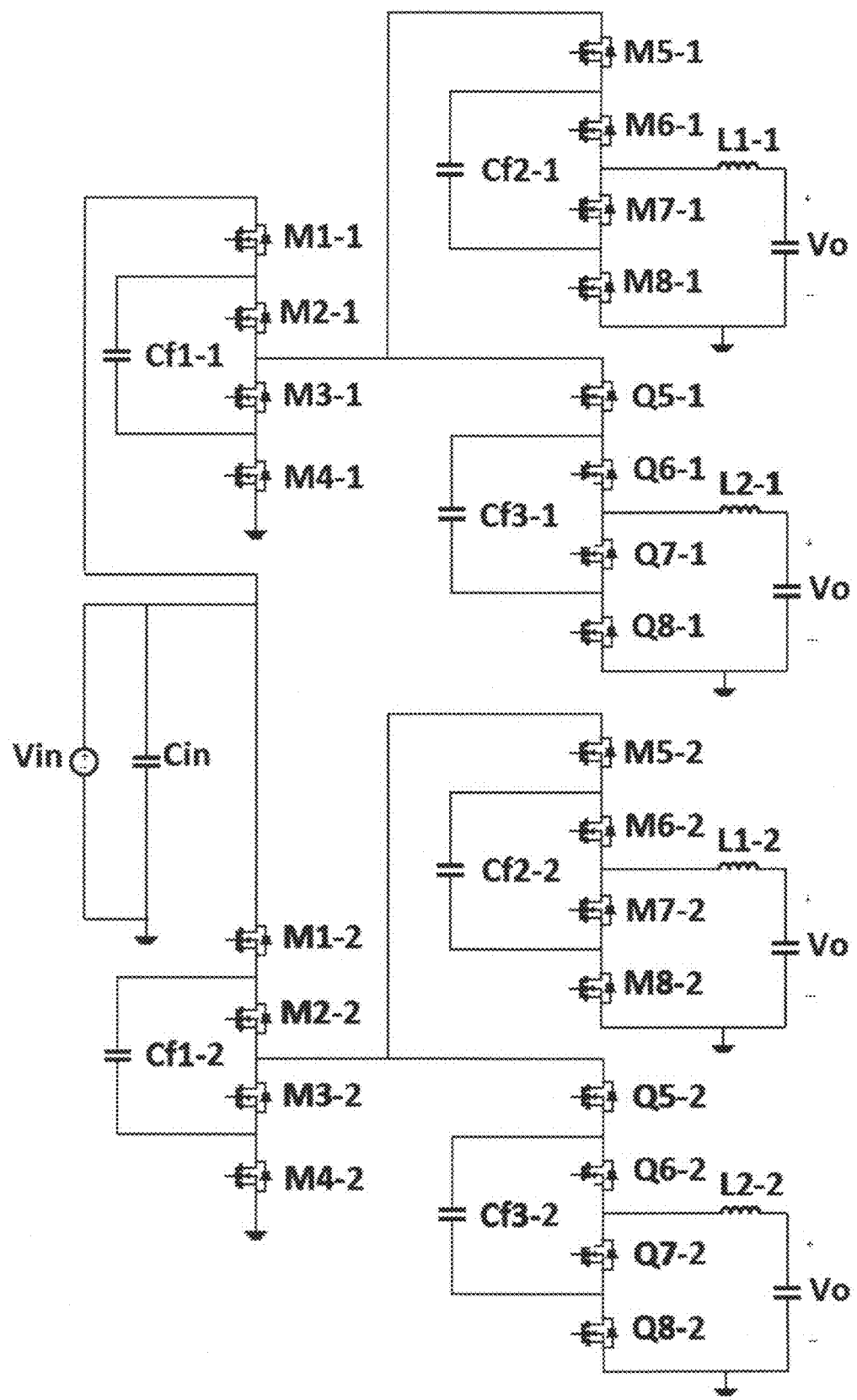
FIG. 17 is a circuit diagram of a two-phase 12-switch ZIV converter, according to one embodiment.

A two-phase 12-switch ZIV converter is shown in FIG. 17. This extension of the 12-switch ZIV converter is noteworthy due to the interleaving that it can achieve on the input power supply. As noted earlier, the ESR loss of the input capacitor can be significantly reduced by using the 12-switch ZIV converter, as the input capacitor now operates with a 50% duty cycle. With a two-phase 12-switch ZIV converter M1-1 will be active for 50% of the duty cycle, and, if the second converter is phase shifted by 180 degrees, M1-2 will be active for the remaining 50% of the duty cycle. In this way, the requirement for the input capacitor is reduced to virtually zero as the input power supply is always able to directly deliver power to one of the phases, with no need for a storage capacitor. It is noted that in a practical implementation a small capacitor may still be utilized, due to considerations such as deadtime, but the current stress of this capacitor, and by extension the loss, will be negligible, enabling a far smaller capacitor to be used.

Generalized $2^n$ ZIV Converter

In various embodiments, a 12-switch ZIV converter topology may be implemented to provide higher step-down ratios such as 8:1 or 16:1 through the addition of more stages.

Figure 18:
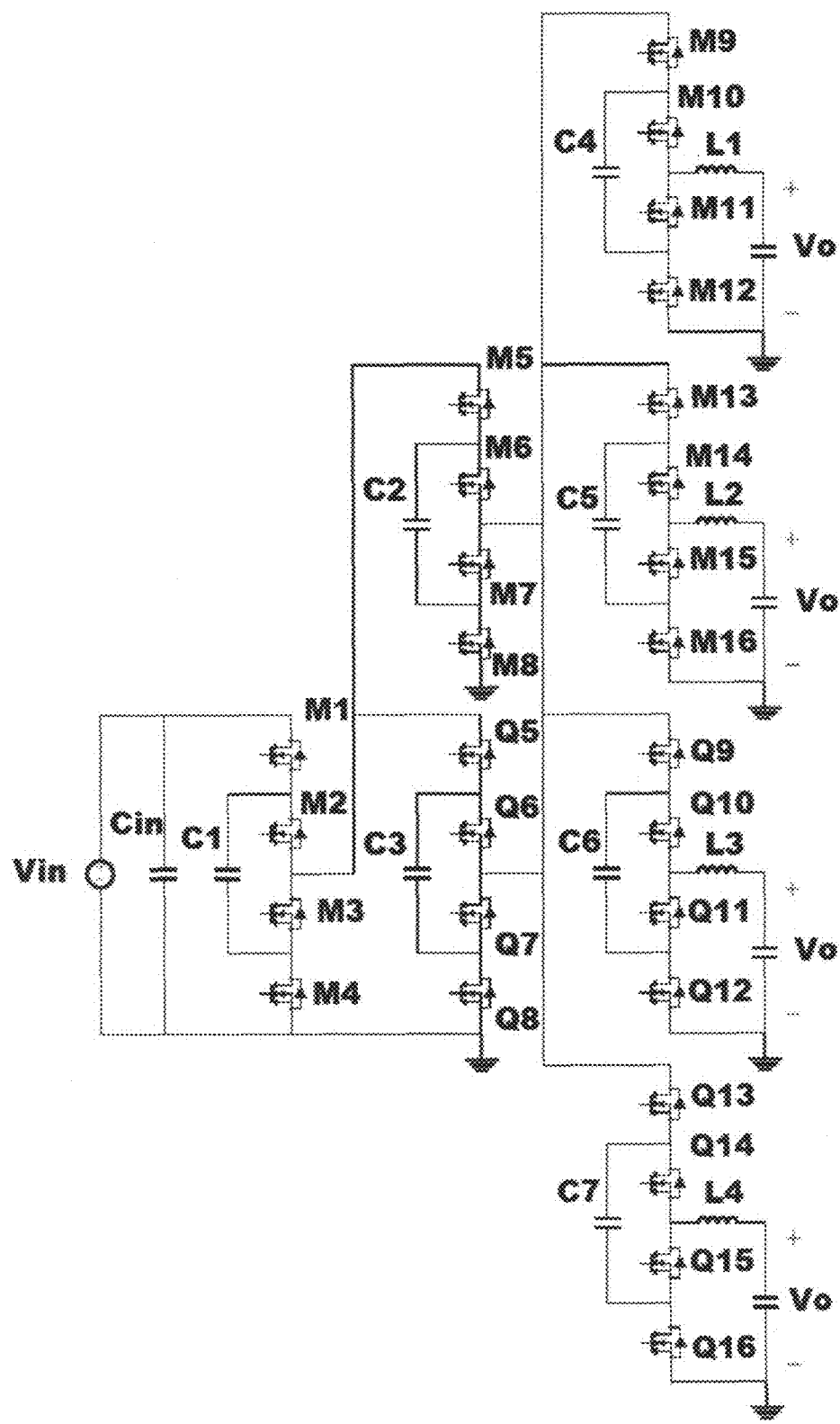
FIG. 18 is a circuit diagram of an 8:1 converter based on a 12-switch ZIV converter topology, according to one embodiment.
Figure 19:
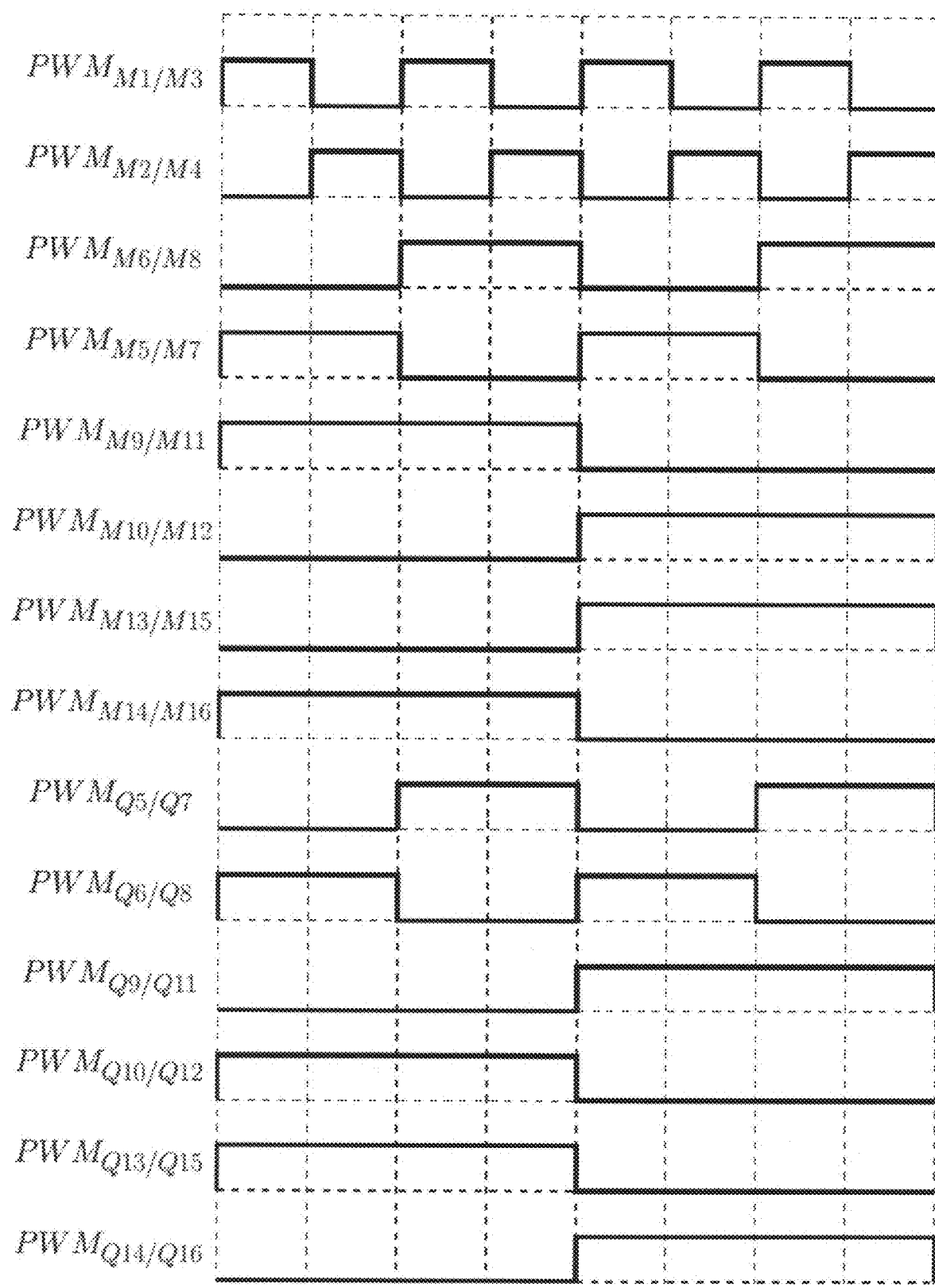
FIG. 19 is a PWM gate timing diagram for an 8:1 converter based on a 12-switch ZIV converter topology, according to one embodiment.

An example of an 8:1 ZIV converter topology utilizing the 12-switch ZIV topology is shown in FIG. 18. The PWM gate timing diagram is shown in FIG. 19. In this converter the first input stage (M1-M4) is unchanged, along with the second stage of two paralleled cells including M5-M8 and Q5-Q8. However, a third or output stage of four cells is added before the output LC filter. The cells are like those of FIG. 8, but in FIG. 19 they are not shown enclosed within dashed lines for clarity. Each of the four cells of the third stage includes four switches and a flying capacitor. The third or output stage operates at ¼ of the switching frequency of the input stage, in order to maintain 50% duty cycle operation on every MOSFET, and 100% duty cycle on every flying capacitor, and provide an additional 2:1 step-down, resulting in an overall step-down ratio of 8:1. This is a significant advantage as the switch utilization for a standard 8:1 topology based on the 7-switch ZIV converter would have poorer switch utilization than the 4:1 7-switch ZIV converter; the first stage MOSFETs M1-M4 would have to operate at only 12.5% duty cycle, and the second stage MOSFETs M5-M8 would be reduced to 25% duty cycle. Therefore, it would not be practical to extend the 7-switch ZIV converter topology to step-down ratios greater than 4:1. In contrast, the general topology based on the 12-switch ZiV converter does not have this limitation.

Further output stages could continue to be added, with each additional stage providing an additional 2:1 stepdown ratio, requiring twice as many cells as the previous stage, and operating at half the switching frequency of the previous stage. Regardless of how many stages are added, the core operating principles remain the same. Due to the "top" or first switch of each cell (M5, Q5, M9, Q9, M13, Q13, etc.; see FIG. 19), each cell can be isolated from the bus nodes that connect the parallel cells together. This means each cell can be charged similar to State A and State B (FIG. 14A and FIG. 14B) and then can discharge in State C (FIG. 14C) without affecting the operation of other cells. The converter operation is straight-forward, as each phase can be analyzed independently using the same techniques as the single-phase ZIV converter. Additional phases are phase-shifted and operate using the same fundamental principles, and the same equivalent circuits.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered exemplary and the invention is not to be limited thereby.

The invention claimed is:

1. A DC-DC converter, comprising:
first and second input terminals for receiving an input DC voltage, the second input terminal connected to a circuit common point;
a first stage comprising first, second, third, and fourth switches connected together in series between the first and second input terminals, a first flying capacitor connected in parallel with the second and third switches, and a first stage output point between the second and third switches;
a second stage connected to the first stage output point, the second stage comprising first and second cells connected together in parallel;
wherein each cell comprises first, second, third, and fourth switches connected together in series between an input terminal and a circuit common point, a flying capacitor connected in parallel with the second and third switches of a respective cell, and an output point between the second and third switches;
an output filter connected to output points of the first and second cells; and
a controller that provides switching signals to the switches of the first and second stages;
wherein a switching frequency of the switching signals provided to the switches of the second stage is half the switching frequency of the switching signals provided to the switches of the first stage;
wherein an output voltage of the DC-DC converter is about 0.25 times the input voltage.

2. The DC-DC converter of claim 1, wherein the switching signals of the first stage provided to the first and third switches are 180 degrees out of phase with the switching signals provided to the second and fourth switches; and
for each of the first and second cells, the switching signals provided to first and third switches are 180 degrees out of phase with the switching signals provided to the second and fourth switches; and
the first and second cells are operated 180 degrees out of phase with each other.

3. The DC-DC converter of claim 1, wherein the first stage comprises an input capacitor connected between the first and second input terminals.

4. The DC-DC converter of claim 1, wherein the switches are IGBTs with parallel diodes or MOSFETs.

5. The DC-DC converter of claim 1, comprising a third stage connected to the output points of the cells of the second stage;
wherein the third stage comprises four cells connected together in parallel;
wherein each cell comprises first, second, third, and fourth switches connected together in series between an input terminal and a circuit common point, a flying capacitor connected in parallel with the second and third switches, and an output point between the second and third switches;
wherein the output filter is connected to output points of the four cells of the third stage;
wherein an output voltage of the DC-DC converter is about 0.125 times the input voltage.

6. The DC-DC converter of claim 5, comprising a controller that provides switching signals to the switches of the first, second, and third stages;
wherein a switching frequency provided to the third stage switches is half the switching frequency provided to the second stage switches;

wherein a switching frequency provided to the second stage switches is half the switching frequency provided to the first stage switches.

7. The DC-DC converter of claim 1, comprising n output stages, wherein each subsequent stage provides an additional 2:1 stepdown ratio, includes twice as many cells as a previous stage, and operates at half of a switching frequency of a previous stage;
   wherein a stepdown ratio of 2n:1 is provided.

8. The DC-DC converter of claim 1, wherein the DC-DC converter is implemented in a power supply architecture with point of load (POL) voltage conversion.

9. The DC-DC converter of claim 1, wherein the input DC voltage is about 48 V.

10. A method for implementing a DC-DC converter, comprising:
    providing a first stage that receives an input DC voltage, the first stage comprising first, second, third, and fourth switches connected together in series between the first and second input terminals, a first flying capacitor connected in parallel with the second and third switches, and a first stage output point between the second and third switches;
    providing a second stage connected to the first stage output point, the second stage comprising first and second cells connected together in parallel, wherein each cell comprises first, second, third, and fourth switches connected together in series between an input terminal and a circuit common point, a flying capacitor connected in parallel with the second and third switches, and an output point between the second and third switches;
    controlling the switches of the first and second stages, wherein a switching frequency provided to the second stage switches is half a switching frequency provided to the first stage switches;
    wherein an output voltage of the DC-DC converter is about 0.25 times the input voltage.

11. The method of claim 10, wherein first stage switching signals provided to the first and third switches are 180 degrees out of phase with switching signals provided to the second and fourth switches; and
    for each of the first and second cells, switching signals provided to first and third switches are 180 degrees out of phase with switching signals provided to the second and fourth switches; and
    the first and second cells are operated 180 degrees out of phase with each other.

12. The method of claim 10, comprising providing a third stage connected to the output points of the cells of the second stage;
    wherein the third stage comprises four cells connected together in parallel, and each cell comprises first, second, third, and fourth switches connected together in series between an input terminal and a circuit common point, a flying capacitor connected in parallel with the second and third switches, and an output point between the second and third switches;
    controlling the switches of the first, second, and third stages, wherein a switching frequency provided to the third stage switches is half the switching frequency provided to the second stage switches, and the switching frequency provided to the second stage switches is half the switching frequency provided to the first stage switches;
    wherein an output voltage of the DC-DC converter is about 0.125 times the input voltage.

13. The method of claim 10, comprising implementing the DC-DC converter with n output stages; wherein each subsequent stage provides an additional 2:1 stepdown ratio, includes twice as many cells as a previous stage, and operates at half the switching frequency of a previous stage;
    wherein a stepdown ratio of 2n:1 is provided.

14. The method of claim 10, wherein the converter is implemented in a power supply architecture with point of load (POL) voltage conversion.

15. The method of claim 10, wherein the input DC voltage is about 48 V.

\* \* \* \* \*